United States Patent [19]

Jensen

[11] 4,076,906

[45] Feb. 28, 1978

[54] APPARATUS FOR INDICATING BATTERY CELL CONDITION

[75] Inventor: Henry E. Jensen, Lafayette Hill, Pa.

[73] Assignee: Eltra Corporation, Toledo, Ohio

[21] Appl. No.: 811,004

[22] Filed: Jun. 29, 1977

[51] Int. Cl.² ............................................. H01M 2/00
[52] U.S. Cl. .................................................... 429/90
[58] Field of Search ............................. 429/90, 91, 66

[56] References Cited

U.S. PATENT DOCUMENTS

| | | | |
|---|---|---|---|
| 1,530,699 | 3/1925 | Ross et al. | 429/90 |
| 3,563,806 | 2/1971 | Hruden | 429/90 |
| 3,992,228 | 11/1976 | Depoix | 429/90 |

Primary Examiner—Anthony Skapars
Attorney, Agent, or Firm—Robert E. Greenstien

[57] ABSTRACT

A battery cell characterized by a plurality of cell plates housed in a container that includes a window adjacent to the edges of several plates. A triangular member of resilient material is attached at its base to the edge of at least one of the plates. The sides of the member contain two lands and the tip of the member contacts the window. The interface between the tip and the window is visible through the window as a single line. As the plate increases in size, the edges of the lands contact the window producing additional lines; the number of lines representing the gradual diminution in the cell life.

6 Claims, 11 Drawing Figures

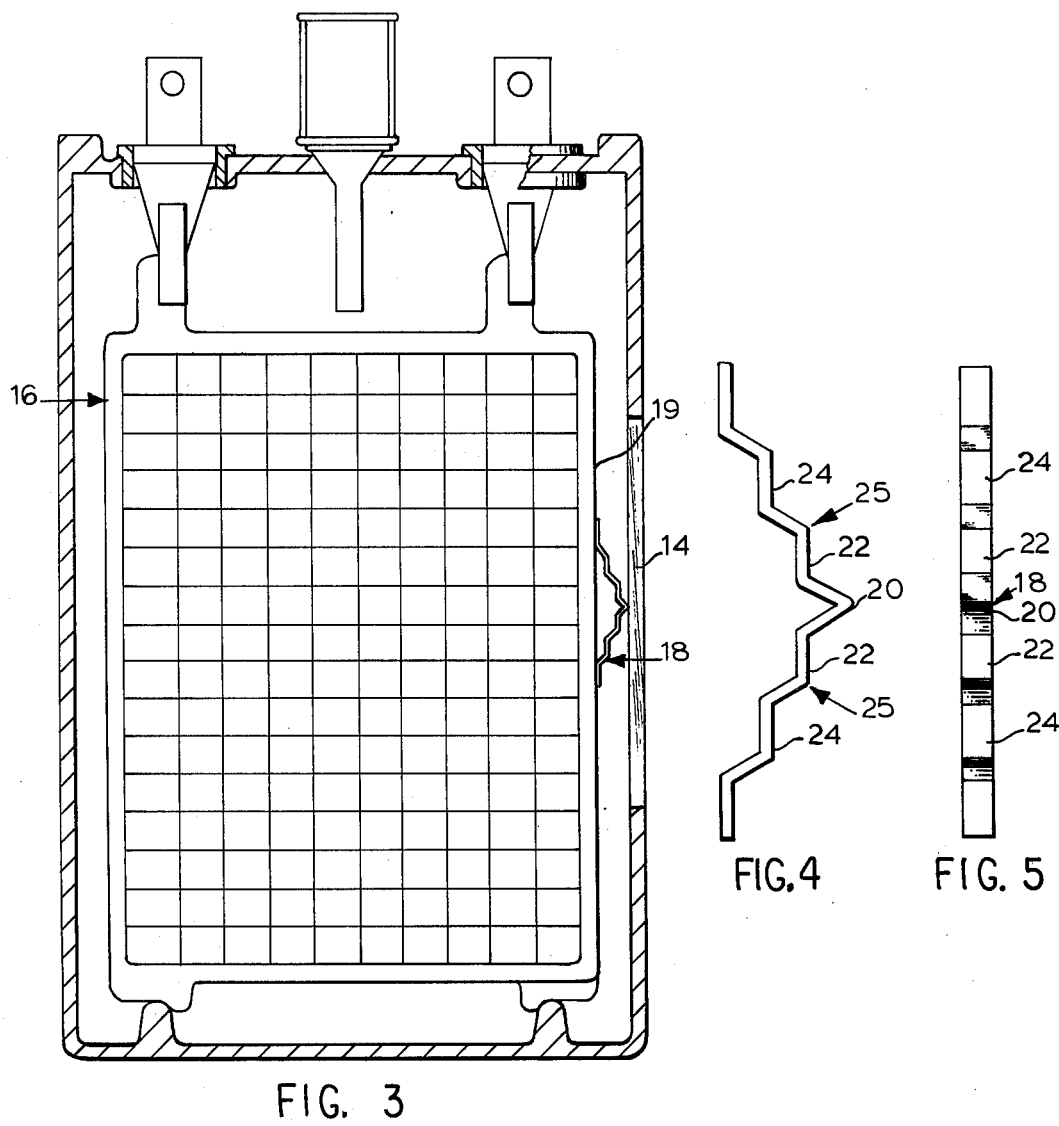

APPARATUS FOR INDICATING BATTERY CELL CONDITION

BACKGROUND OF THE INVENTION

This invention relates to lead-acid storage batteries, and specifically provides for a novel apparatus by which the condition of the battery cells can be readily ascertained from outside the cell container to facilitate cell maintenance.

A lead-acid storage battery cell is comprised of a plurality of plates (anodes and cathodes) immersed in an acid electrolyte. The plates are constructed of a suitable lead alloy, such as lead-calcium. The particular lead alloy employed depends upon the specific battery application, since different alloys offer different battery characteristics: for example, cycling time and discharge rate. The plates are constructed as a grid so as to optimize the active surface area, and the grids are filled with the active battery material in a paste form.

There are numerous factors contributing to the gradual diminution in usable battery life. The most notable of these being anode grid enlargement. As noted in the article titled, *Positive Grid Design Principles*, The Bell System Technical Journal, 1279 (1970), by minimizing the anode enlargement the usable battery life can be extended. This is particularly true of those batteries employed under float charge conditions, for example, as emergency standby power sources in the telephone industry. As noted in that article, grid enlargement results from the slow growth of a lead-oxide deposit within the anode grid structure, which having a specific volume that is 21% greater than that of the lead alloy, thus requires greater space in the grid structure than the lead consumed in producing the oxide. The consequential grid enlargement can produce among other things plate shorting and post and jar cracking. More importantly, this can result in cracks in the grid which thereby subject the balance of the grid to higher than normal electrical currents. The higher electrical currents can generate local hot spots in the grid which can produce further grid fragmentation or cracking. This fragmentation process is thus best defined as being regenerative once it starts and is a particular problem in those cells that are float charged by maintaining a constant voltage across the battery cells of 2.17 volts, this being 110 mv. above the open circuit cell voltage of 2.060 volts.

Accordingly, the slow enlargement of the cell anodes represents the slow but continuous decrease in cell life, even if the cell is not in use.

Thus it is an object of the present invention to utilize the relative change in anode size over time to produce an indication of remaining cell life which is both quick and reliable. This is particularly beneficial in standby power situations under which conditions the cells must be maintained in an optimum condition at all times without the benefit of operational testing. By utilizing the indicator of the present invention, those batteries having substantially enlarged anodes are easily determined and can be routinely removed from service and replaced.

SUMMARY OF THE INVENTION

In accordance with the present invention, a resilient indicator is placed between the anode edge and the cell container. The indicator contacts either the container wall, which is transparent, or a window in the wall so that the resulting contact interface can be seen. As the anode enlarges, the indicator is squeezed between the anode edge and the wall, causing the interface to undergo a noticeable change in size and shape. Means are included on the indicator to produce a change in noticeably discrete steps, each of which steps represents a preselected portion of the total cell life.

Further adaptations, features and modifications of the present invention will become readily apparent to those skilled in the art from the following detailed description and claims, wherein:

DESCRIPTION OF THE DRAWING

FIG. 3 shows the cell in a cross-sectional view along the line 3—3 in FIG. 2 and shows the indicator member of the present invention in a contact relation with the container window.

FIG. 4 shows the indicator member of the present invention as seen from the side thereof.

FIG. 5 is a frontal view of the indicator member shown in FIG. 4.

DETAILED DESCRIPTION

Figure 1:
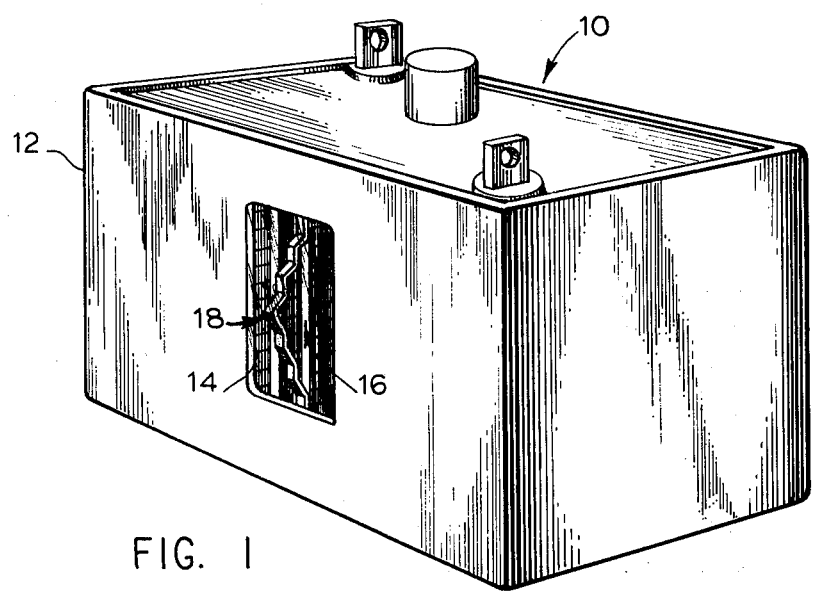
FIG. 1 shows a bettery cell in a perspective view which employs the present invention.
Figure 2:
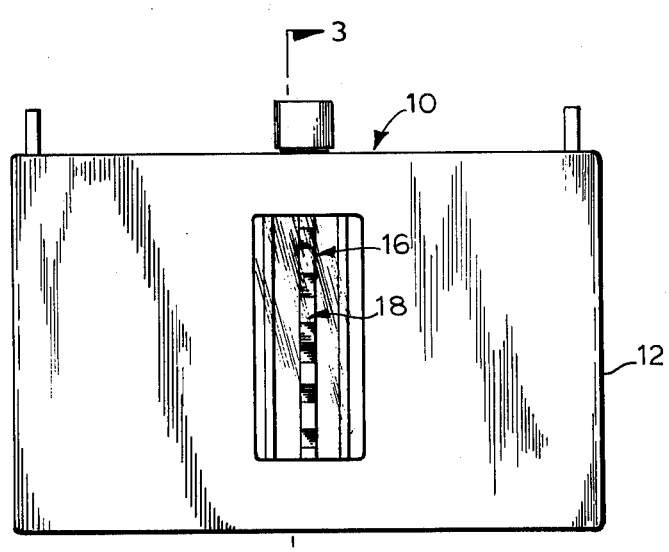
FIG. 2 shows a frontal view of the cell in FIG. 1, as seen from the container side including the viewing window. The indicator member of the present invention can be seen through the window.

In FIGS. 1 & 2 there is shown a battery cell 10, which is housed in a container 12 having a window 14 in the container wall adjacent the edges of several cell plates 16. Attached to one plate (an anode) is a resilient triangular member 18, as shown in the cross-sectional view of FIG. 3. Member 18 is attached at its base to the plate edge 19 with the tip 20 contacting the inner surface of window 14. Plate 16, as shown in FIG 3, is assumed to be in a new condition; this being characterized by a plate grid structure which is not enlarged substantially.

Referring to FIG. 4, member 18 can be seen to include two lands 22 and 24 on each of the two side sections 25. Each side section 25 is a mirror image of the other so that there are two sets of lands, each set containing the lands 22 and the other lands 24. As set forth below, the lands produce an indication of cell life in preselected finite steps.

Figure 6:
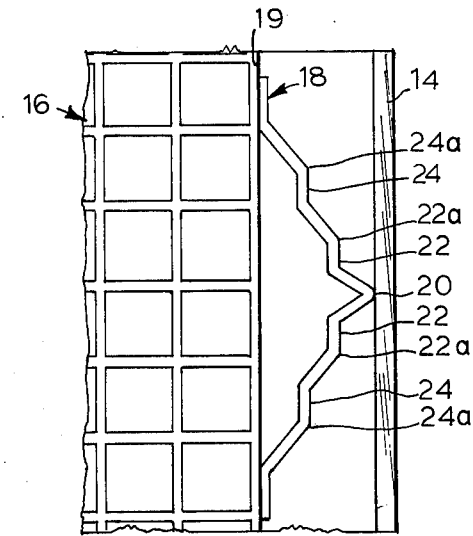
FIGS. 6 & 7 respectively show the indicator member from the side and also as it appears through the container window when there is substantially full remaining cell life.
Figure 7:
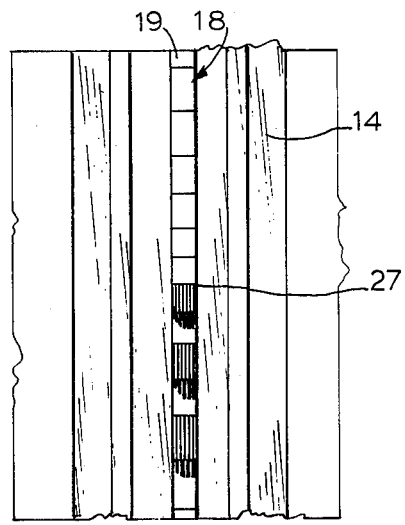

Operation of the indicator is as follows: As the distance between the edge of plate 16 and window 14 decreases due to plate enlargement, member 18 is compressed therebetween. As a result, tip 20 is pressed towards lands 22, and as the distance decreases still further, the outer edges 22a of lands 22 contact window 14. In FIG. 6, plate 16 is shown in unexpanded configuration and the interface between the edge tip 20 and window 14 is visible through the window as a small line 27. (FIG. 7) The appearance of line 27 through the window provides an indication of a substantially new cell.

Figure 8:
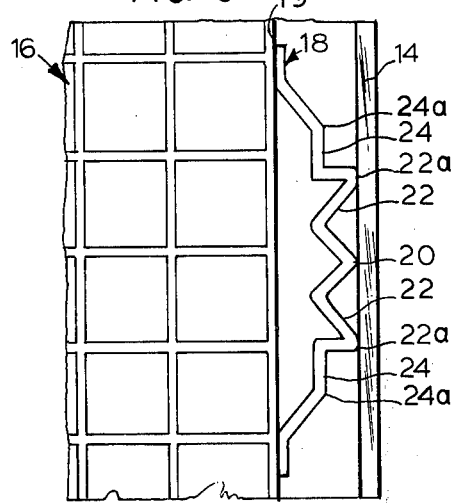
FIGS. 8 & 9 respectively show the indicator from the side and also as it appears through the container when there is at least two-thirds remaining cell life.
Figure 9:
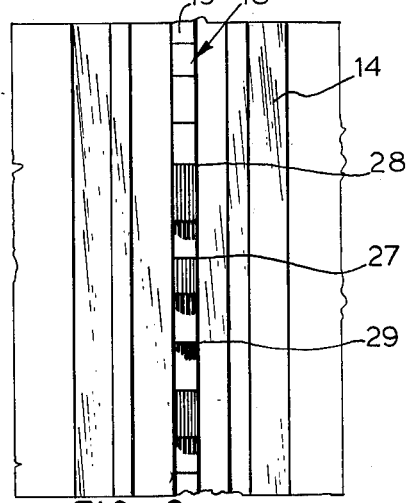

Referring now to FIG. 8, plate 16 is shown to be somewhat expanded configuration compared to its configuration in FIG. 6. The distance between the plate and window 14 accordingly has decreased somewhat and the edges 22a of land 22 and tip 22 are now visible through window 14 as the three lines 27, 28, 29 and serves to indicate to the observer that there is at least two-thirds remaining cell life. Lines 28, 29 are the interface between edges 22a and window 16.

It is important to note that because of the lands the three lines appear suddenly. This is of course a result of the fact that there is one maximum distance between the edge of plate 16 and window 14 at which tip 20 and edges 22a can simultaneously contact window 14. In the present embodiment this distance has been arbitrarily assumed to be indicative of a relative change in plate size reflecting a relative change in cell life of at least one-third.

Figure 10:
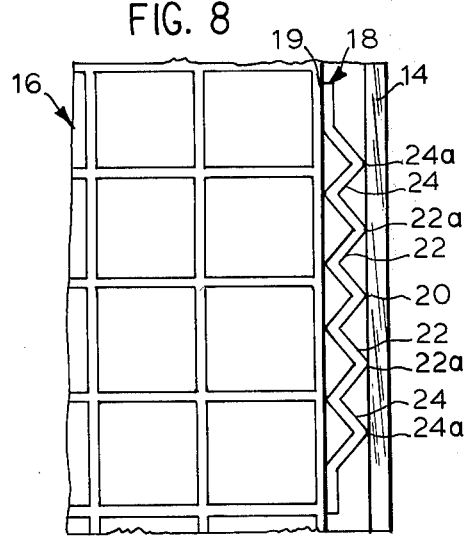
FIGS. 10 & 11 respectively show the indicator member from the side and also as it appears through the container when there is at least one-third remaining cell life.
Figure 11:
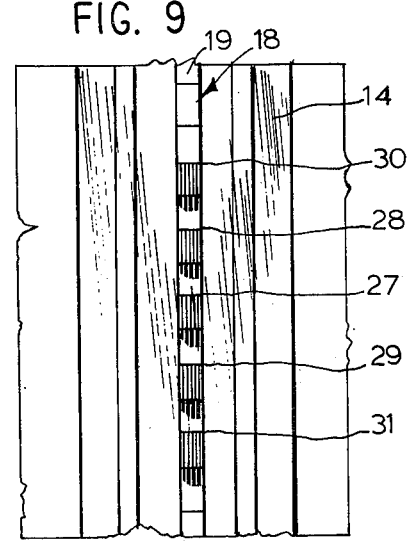

With the foregoing in mind, plate 16 as shown in FIG. 10 is to be observed as being substantially larger than its configuration in the preceding FIGS. 8 and 6 and serves to represent a plate of substantial age. In this particular configuration, tip 20, edges 22a and the edges 24a of lands 24 all contact window 16 to produce the five lines 29-31, visible through the window 16 and indicating a reduction in cell life of at least two-thirds.

The position of lands 22 and 24 is of course determined by the original distance between the plate edge and window and the gradual reduction in this distance over the life of the cell. A correlation, by way of experimentation between selected fractions of cell life and the plate to window distance is first determined. After this relationship is known, the lands 22, 24 are positioned on the member 18 with reference to window 16 so that the edges 22a, 24a will contact window 16 when the plate to window distance is approximately at the experimentally obtained values.

It should be clear that additional lands can be provided for more increments of cell life, if so desired. And although the member 18, shown herein, is simply a triangular piece of material containing the suggested lands, any other member having a generally triangular cross-section, such as a cone, could also produce the same results, if similarly positioned in the cell. In the latter case, circular lands would be included around the cone circumference to produce an interface that is circular — rather than a linear which increases in finite steps of prescribed cell life fractions, determined in the above manner.

In still another embodiment of the invention, tip 20 of member 18 is oriented to contact plate edge 19 instead of the cell container or window. The interface between the edge 19 and tip 20 is visible through the container or window, which are transparent for this purpose. As the plate enlarges, the interface changes size and shape in the manner stated above, and is observed through the window to indicate a relative change in cell life.

While a window has been shown in this preferred embodiment, it should be clear that a completely transparent cell container would prove equally effective and hence constitutes a practical alternative embodiment. The indicator member 14, of course, should be made of an acid resistant material and should be sufficiently flexible to sustain the transformations shown in FIGS. 6-11, without applying undesirable pressure to the plate edge and also to remain responsive to the gradual change in plate to window distance. At the same time, member 18 should be resilient enough so as to maintain its shape over a period of time. A particularly suitable material in light of these parameters is polypropylene, which is often used to construct the container.

While I have attempted in the foregoing description to describe what is at present the preferred embodiment of my invention, it will be obvious to those skilled in the art that there are numerous possible modifications and variations which can be made to the embodiment shown, but which nevertheless embrace the true scope and spirit of my invention. Therefore the following claims are intended to cover all such modifications, variations and equivalents.

What is claimed is:

1. A cell condition indicator for battery cells having a plurality of cell plates, comprising:
  a cell container, and
  indicator means visible through said container responsive to a change in plate size.

2. The indicator according to claim 1, wherein:
  said indicator means comprises a resilient member which extends from at least one of the cell plates to contact the container, and the contact interface between said container and said member is visible through the container and changes as the distance between the plate edge and said container changes.

3. The indicator according to claim 2, wherein:
  said member includes means for producing a discontinuous change in said interface corresponding to preselected portions of the cell life.

4. The indicator according to claim 3, wherein:
  said member is characterized by a generally triangular cross-section with the tip of said member in contact with said container to produce said interface.

5. The indicator according to claim 4, wherein:
  said member includes a plurality of lands which contact said container at selected distances between said container and the plate corresponding to said preselected portions of the cell life.

6. The indicator according to claim 5, wherein:
  said container includes a window in a wall thereof adjacent said member, said tip of said member contacts the said window to produce said interface which is visible through said window.

* * * * *